INVENTOR.
EVERETT R. SARRATT

INVENTOR.
EVERETT R. SARRATT

INVENTOR.
EVERETT R. SARRATT
BY
ATTORNEY

United States Patent Office 3,129,322
Patented Apr. 14, 1964

3,129,322
DIGITAL DATA PROCESSING SYSTEM
Everett R. Sarratt, Baltimore, Md., assignor, by mesne assignments, to Laboratory For Electronics, Inc., Boston, Mass., a corporation of Delaware
Filed Apr. 7, 1960, Ser. No. 20,742
5 Claims. (Cl. 235—92)

This invention relates in general to data handling devices and more particularly to systems for translating the information contained in an electronic scaler onto a printed tape.

Electronic scalers which accept input voltage pulses and count them on a continuous basis, providing as an output the total number of pulses accrued in a given interval, are well known in the art. While there are a great variety and number of applications of such electronic scalers, one application in which they have been widely used is that of the nuclear particle counting field. In this field a primary detector of the radiation provides electronic pulses which are counted by the electronic scaler and the information generally displayed is the total number of pulses accrued in some preset interval and the duration of time of that interval. The electronic scalers in this field, as in other fields of scaler applications, generally consist of individual scales which totalize the count of, for example, ten pulses and the individual scales are cascaded to provide a total counting capacity of five or more digits. In many cases the timer section of this electronic scaler employs the same technique counting the number of electronic pulses from a stable oscillator which serves as a time base and again may run up to several digits. The information from these scalers has, in the past, customarily either been displayed as a register number, generated by having the scaling elements themselves drive a mechanical register, or by reading out neon light indicators corresponding to a particular number in each one of the cascaded scales. More recently a single electronic tube having several electrodes operating on a glow discharge transfer type of principle has been used as the basic scaling element. In this application the data display may take the form of numbered positions corresponding to the electrode on which the glow discharge is located when that number of pulses has been received by the scaler unit.

While the above techniques provide in general sufficient visual observation of the scaler information, they do not, of course, provide any permanent record. Thus when, for example, a number of radioactive samples are counted in succession, the information from one sample must be manually transcribed before the next sample can be measured. A permanent record of this scaler information such as a printed out tape is desirable and particularly so when operated in conjunction with automatic equipment which is capable of successively introducing and counting a large number of samples.

Systems capable of providing such printed out data have been devised and, in general, have utilized multiple stepping switches wherein each count position on each of the scale units is electrically connected to a corresponding contact of one of the multiple position switches and to "read out" the scale the switches are stepped to the position which is activated by the scale and which therefore corresponds to its reading. The stepping action of the switch has been linked to a printed device of some type and the number of steps controls the number that is entered in to be printed. Such systems are unwieldy and offer some severe disadvantages, particularly in the number of wires that are required to be connected between the printing unit and the scale. For example, if there is a six digit system with each scale totalizing ten counts, this corresponds to 60 wires connecting the scaling unit to the stepping switches which might again have to consist of six parallel banks with ten contacts. The number of wires required may of course be varied by the use of a matrix inserted between the scaling units and stepping switches or printers; however, this further complicates the apparatus. Another disadvantage of this type of printout device is the relatively short life resulting from the mechanical action of the stepping switch.

It is therefore a primary object of the present invention to provide an economical efficient system for printing out the information contained in an electronic scaler.

It is another object of the present invention to provide a system for translating information from an electronic scaler to a mechanical printing device in a manner which minimizes the number of electrical wires required to join the two units.

It is still another object of the present invention to provide an exceptionally long-lived system for translating the information on an electronic scaler into an automatic printing device.

It is another object of the present invention to provide a system for automatically counting and recording a series of measurements of the number of electronic pulses applied to the input of an electronic scaler.

Broadly speaking, the present invention utilizes a translator unit, which has its own internal programming enabling it to read out each sub unit of an electronic scaler individually and to select which sub unit shall be read out, and providing this information to a solenoid actuated automatic printing unit in serial fashion, thereby requiring a minimum number of electrical connections from the electronic scaler to the printing unit. The scaling unit in the system is arranged such that the links between the cascaded scales operate in conjunction with the translator to provide in one part of the overall cycle normal scaling action and in the readout part of the operating cycle independence of action between each of the scale units. The translator may then be considered as having an address system which includes these interscale links in the scaler unit. The function of the address system is to select electronically the scale in the electronic scaler unit which is at the moment to be read out. The translator also has an operational function which takes the information from the scale being addressed and converts it into a digit position stored in the printer. The overall action of the translator is controlled by a program function which, in response to a readout command from the scaler unit, does the following: controls the address system in proper sequence; provides for the actual printing of the information when all the information from the scaler is stored in the printer unit; next, resets the translator; finally, returns a signal to the scaler unit indicating the completion of the "readout" cycle.

Other objects and advantages will become apparent from the following detailed description when taken in conjunction with the accompanying drawing in which.

Figure 1:
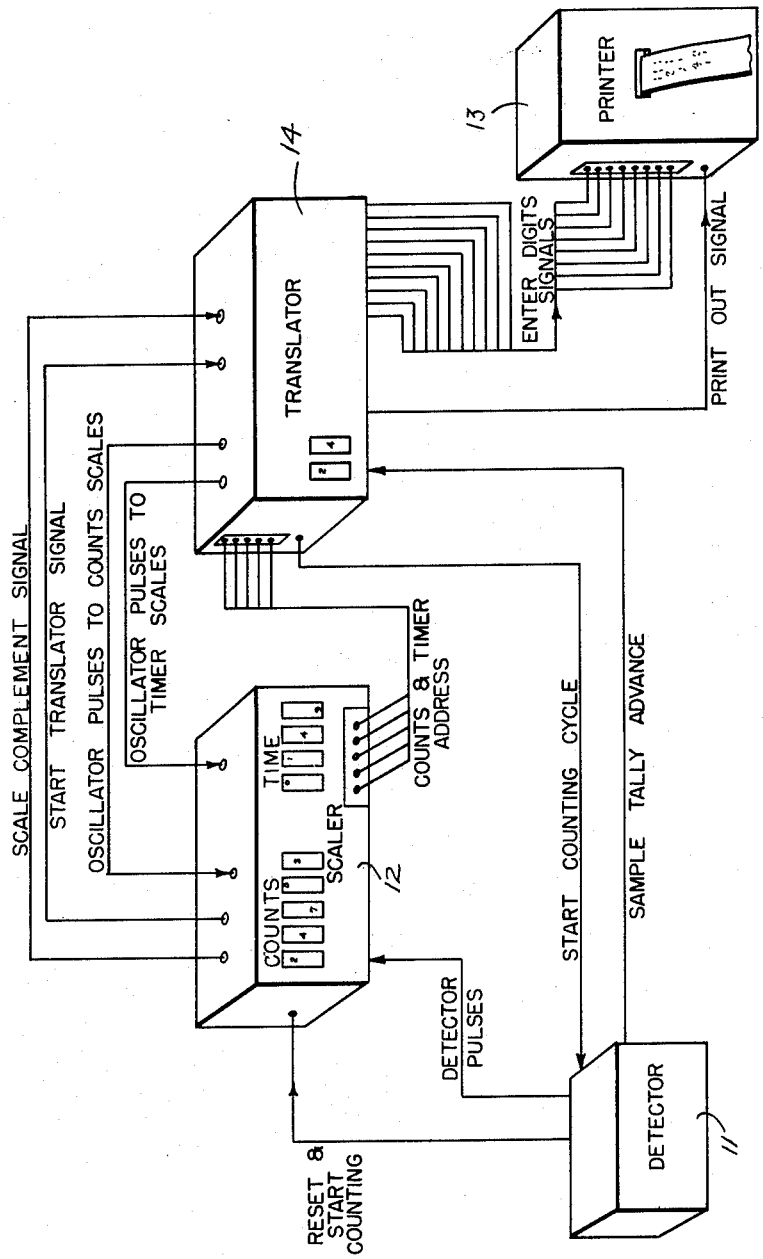
FIG. 1 is an illustration partly in perspective and partly in block diagrammatic form of one embodiment of this invention.

With reference now specifically to FIG. 1, a detector and sample changer unit 11 is shown coupled to an electronic scaling unit 12. The detector unit 11 may be any source of electronic pulses which the electronic scaler unit 12 is adapted to count and which provides a signal resetting the scales after one measurement and starting the next measurement. Typically the detector and sample changer may well be a nuclear particle detector, such as a Geiger tube or the like, equipped with automatic sample changing apparatus which successively presents samples to be counted to the detector's sensitive volume and provides a start signal to the scaler for each such sample. The electronic scaler unit 12 may be of the conventional type having cascaded decade scales for totalizing the input pulses. Five such scales are illustrated here under the heading "Counts" providing a total capacity of 99,999 counts. In addition, there is a time scale which again operates on cascaded decades and is shown here as having four digits which might for example have a total time capacity of 99.99 minutes. The electronic scaler utilized in the overall system presented here provides some specific circuit details not present in conventional scales which will be described in more detail below. The printer unit 13, capable of printing out digital information on a paper tape, is shown coupled through a translator unit 14 to the electronic scaler 12. The overall function of the translator unit 14 is to transfer the information contained in the counts and time scale on scaler unit 12 to the printer unit 13 and cause the printer unit to print out this information for each measurement of the detector 11. The translator 14 is connected to the scaler 12 by five parallel electrical connections constituting the address system. In addition, there are two connections from the translator to the scaler labeled oscillator pulses to the counts scale and oscillator pulses to the time scale. The remaining two connections run from the scaler to the translator and one provides a scale complement signal, that is a signal which is transferred to the translator for each decade unit in the scaler when that decade unit is filled and a "Start Translator" signal running from the scaler which initiates a readout and print-out cycle. The translator is coupled to the printer with ten parallel connections labeled "enter digit" signals and a single connection which provides a print-out command signal. The translator also provides a start counting cycle signal to the detector 11 at the termination of a readout and print-out cycle to initiate the next counting cycle. The translator unit 14 also includes two decade units which serve to indicate the number of the sample being measured or read out. This latter function is referred to as "Sample Tally."

Having described the interconnection of the components, the overall function will now be described. As previously indicated, the overall function of the system is to count and provide on printed out tape the total number of counts accumulated during an interval, as well as an identification of the sample and a printed out value for the time duration of the interval. Thus the detector element 11 initiates counting and at the end of a preselected interval which may be either a maximum total number of counts or a maximum total time, the scaler unit 12 stops counting and sends a signal to the translator unit 14 initiating a readout and print cycle. The translator is programmed so that it serially reads out each scale unit of both the counts and the time in the scaler, printing out on the printer the total counts, then the total time, and in addition reads and prints out the sample tally included in the translator unit 14. As indicated, there are in this embodiment five address lines between the translator and the scaler. Within the scaler each address line goes to two different positions. One position is in the counts scale and the other position is in the time scale. The programmer within the translator selects one address line and activates it, thus rendering one decade in the count scales and one decade in the time scales active, and at the same time the programmer selects one of the two leads for oscillator pulses. Thus one decade unit in the entire electronic scaler is at the same time addressed and provided with oscillator pulses from the translator. The oscillator within the translator then applies pulses at a predetermined frequency to the selected scale and simultaneously to a readout scale unit within the translator. When the individual scale in scaler 12 which is being addressed has enough pulses applied to reach the zero position, that unit has been complemented and a signal is provided back to the translator which stops the oscillator running. The leads for the oscillator pulses not only carry the alternating current oscillator pulses but also, by virtue of a D.C. bias, they segregate the individual scale units so that they are no longer cascaded during the readout cycle. When the oscillator in the translator is stopped by virtue of the complement signal the readout scale within the translator has received that number of pulses required to complement the unit address in the scaler 12. By designating the digits in the translator readout scale in reverse order, that is from 9 to 0, then the readout scale now reads what the unit on the electronic scaler 12 read. For example, if the unit being addressed had seven pulses on it, it would require three pulses of the oscillator to complement this unit and these three pulses would drive the readout scale in the translator from zero to nine, nine to eight, and eight to seven. At this point in the operation the programmer in the translator enters the digit reached in the readout scale into the printer and then restarts the oscillator which now applies pulses to the same unit in the electronic scaler and to the readout scale, stopping however when the readout scale reaches zero, thus leaving the readout scale in the cleared zero position and the unit addressed back in its original position. The translator programmer then moves to the next decade unit address and repeats the process. When it has completely addressed all the units in the counts section of the scaler and entered the respective digits into the printer, the translator issues a print command to the printer which stamps out these digits. The translator then repeats this same process with the time scale unit in the electronic scaler, prints them out, and does likewise for the two sample tally scales within the translator. At the termination of all the printouts the translator programmer sends a signal to the detector and sample changer initiating the counting of the next sample, and the detector 11 signals the electronic scaler resetting all the scale units to zero and starting the measurement for the next sample. The overall operation then is one of measuring a sample, reading it out from the scaler, putting the information into the printer and printing out, then advancing to the next sample and repeating the process.

Figure 2:
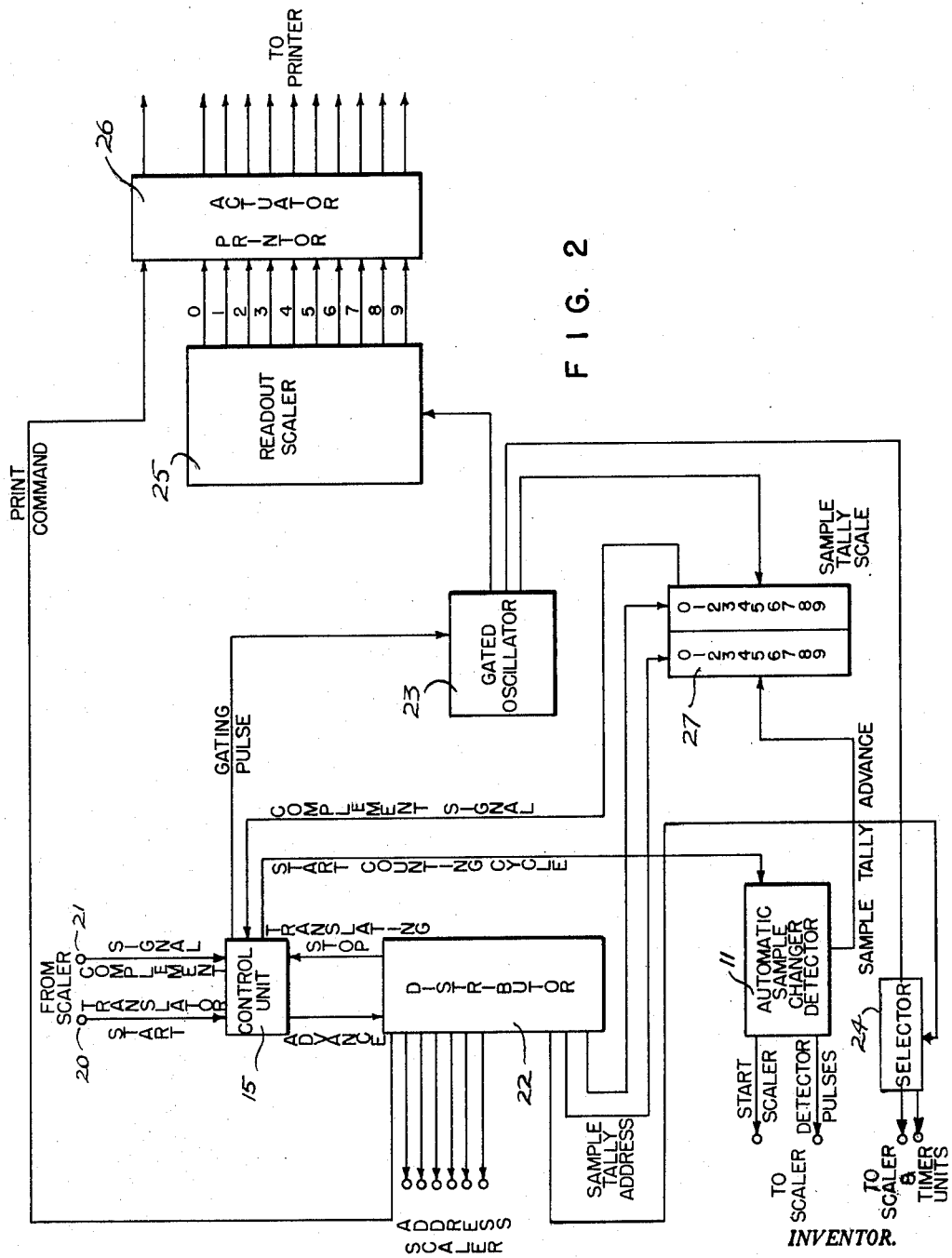
FIG. 2 is an illustration in block diagrammatic form of the translator unit of this invention.
Figure 3:
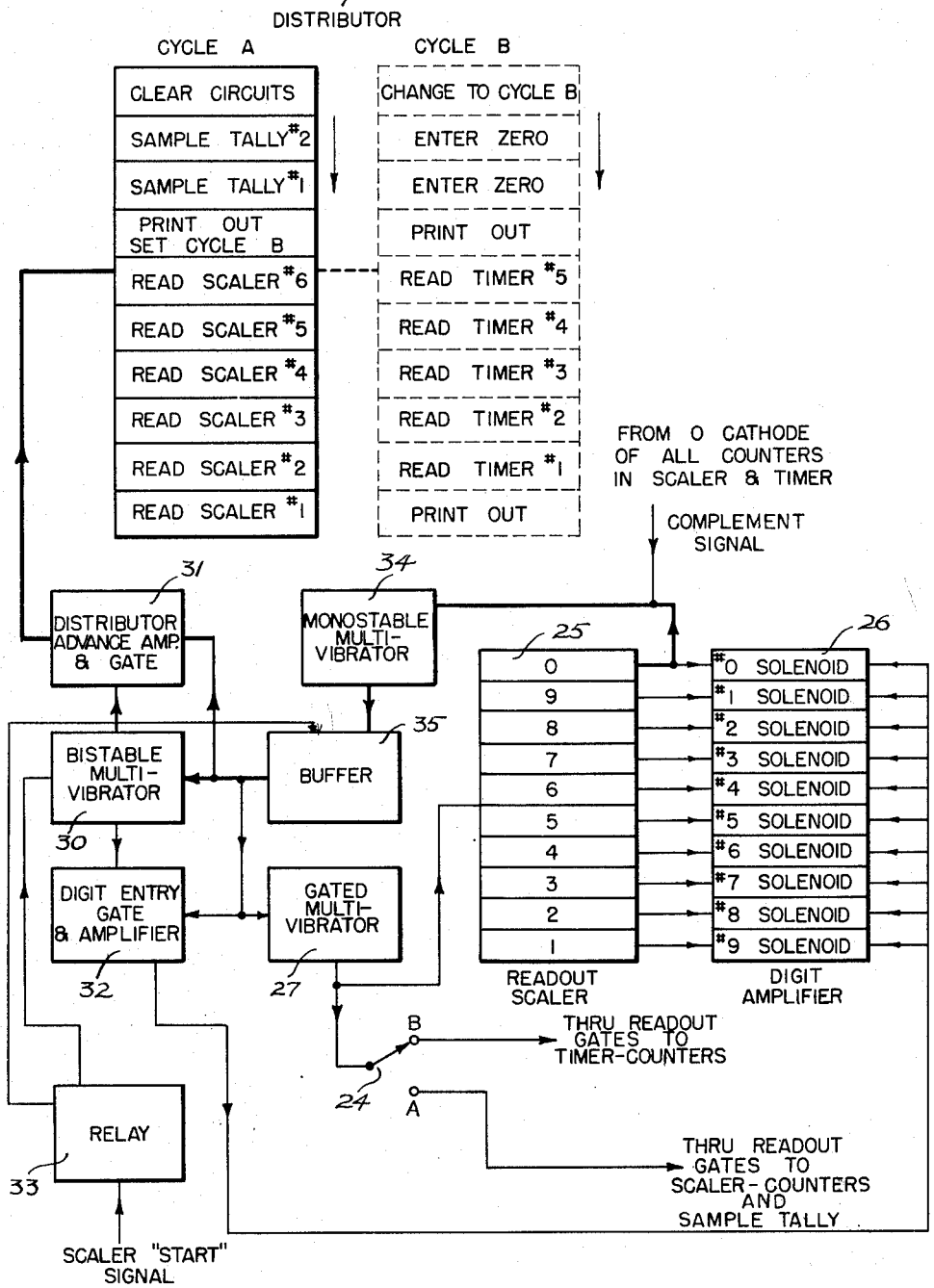
FIG. 3 is a detailed illustration in block diagrammatic form of the translator of this invention.

In the data processing system described, the programming logic is, for the most part, contained within the translator unit 14. FIGS. 2 and 3 are block diagrams of the translator unit. FIG. 2 is a somewhat simplified version showing the functional operation of the translator, while FIG. 3 is a more detailed block diagram of its operation. The automatic sample changer and detector unit have been included in the diagram in FIG. 2 in order to clarify the transfer of programming signals from the translator through it to the scaler.

With reference now specifically to FIG. 2, the translator is seen to include a control unit 15 having two inputs 20 and 21 from the scaler. Input 20 is a signal which starts the translator cycle after a measurement has been completed, while input 21 is the complement signal, which indicates that, during the readout cycle, one of the scale units in the electronic scaler has been filled up. A distributor unit 22 is controlled by the control unit and serves as a programmer for the translator action. It is shown as having the six separate address leads to the scaler unit and two address lead to the sample tally scale 27, which is included within the translator. The distributor is stepped from one address point to the next by advance signals from the control unit 15 and as the final step it provides a stop signal to the control unit 15, which in turn relays this signal in the form of a start counting signal to the sample changer and detector unit 11. Although there are only six address contacts shown going to the electronic scaler, these represent eleven address points since the distributor cycles these address points once when addressing the counts section of the scaler and once when addressing the time section of the scaler. The control unit 15 also provides an operating signal to a gated oscillator 23. The gated oscillator is, for example, a free running multivibrator which in response to a signal from the control unit provides output pulses at a predetermined frequency until it receives a stop pulse from the control unit 15. One of the outputs from the gated oscillator 23 is shown supplied to the scaler selector unit 24 which in one position of the distributor provides oscillator pulses to all the counts decades and in another distributor position provides oscillator pulses to all the time decades in the electronic scaler. As already discussed the oscillator pulses actually drive only that decade which is both addressed by the distributor address system and supplied pulses through this scaler selector switch unit. Another output of the gated oscillator is provided to the sample tally scale 27 and operates in conjunction with the address to these scales from the distributor to read out the sample tally digits. The third output from the gated oscillator is provided to the translator readout scaler 25.

The readout scaler 25 may be any conventional decade unit, which is however operated in reverse order as indicated in FIG. 2; that is, a single pulse into it indicates as a 9 digit whereas nine pulses into it indicates as a one digit. Each digit on the readout scale 25 is coupled to a corresponding position on the printing actuator unit 26. This latter printer actuator unit provides that when the readout scaler stop on a particular digit, for example "5," the actuator enters the digit 5 into the automatic printing unit and further that at the reception of a print command signal from distributor 22 the entered digits are printed.

The overall operation then is that upon completion of the measurement cycle at the detector a signal is given to the translator control unit 15 on input 20 which control unit then advances the distributor 22 from its quiescent position to the first address point which would be the first decade unit in the counts section of the electronic scaler 12. The decade units in the scaler are no longer cascaded, having been isolated by a bias voltage applied to the inter decade coupling through the connection from the scaler selector point unit 24. On this part of the distributor cycle the scaler selector unit 24 is connecting the counts section of the electronic scaler. The control unit, after advancing the distributor to the first address point, gates the oscillator 23 which provides pulses simultaneously to the readout scaler 25 and the address decade in the counts section of scaler 12. When the addressed decade unit in scaler 12 is complemented the complement signal is given on input 21 of control unit 15 which then stops the gated oscillator 23. The readout scaler has indicated on it at this point the number of pulses required to complement the addressed decade and enters the digit corresponding then to the number of pulses which were on this decade. The control unit 15 then advances the distributor to the next step which is the next decade and the process is repeated. Upon the completion of complementing all the counts decade units in scaler 12, the distributor is advanced to the print command address which operates through printer actuator 26 to print out the digits entered and clear the printing unit. The distributor is then advanced to the position where it changes the scaler selector unit 24 so that oscillator pulses are channeled to the time units in the scaler 12. The distributor then repeats in steps each address point and the decade units in the times section are now read out in precisely the same manner and printed. In the final portion of the cycle the distributor addresses each of the sample tally decades and these are read out and printed out in the same manner. For purposes of clarity the sample tally decades have been described as the last operational step of the distributor prior to restarting a measuring cycle; however, normally it would be more convenient first to read out and print out the sample tallies, thus heading the printing by a sample identification.

With reference now to FIG. 3, a more detailed diagram of the translator is shown. The distributor 22 is shown as having ten positions which operate on two different cycles, cycle A and cycle B, and the translator in this embodiment is capable of reading out six count scale units on the electronic scaler, two sample tally decade units, and five timer decade units. On the fourth position of the distributor in cycle A which is a print-out command position for the sample tally readout, the distributor also enables switch 24, which sets the distributor to run through cycle B when it again reaches the first position of the distributor. In FIG. 3 there is no control unit as such shown, but rather each of the operational units within the translator circuit which in the overall exercise the control unit function are shown. The action characteristic of each one of these units will first be described and then the overall sequential operation will be discussed.

A bistable multivibrator unit 30 has the characteristic of having two stable states. In one stable state, which will be referred to as state X, the multivibrator provides an open signal to the distributor advance amplifier and gate 31. In the opposite stable state, referred to as state Y, the multivibrator 30 provides an open signal to the digit entry gate and amplifier 32. A relay 33 responsive to the start signal from the scaler provides that, at the initiation of translator action, bistable multivibrator 30 is always in the X position, holding open the distributor advance gate 31. A monostable multivibrator 34 is triggered by a signal either from the complement signal input or from the zero position of readout scaler 25 and provides as an output a single pulse of positive polarity having a duration of approximately 100 milliseconds. The output of the monostable multivibrator 34 is provided to a buffer stage 35. This buffer stage is also provided with a signal from scaler start relay 33 at the initiation of the translator cycle. The gated multivibrator 23 is a bias controlled free running multivibrator which free runs at a frequency of 100 cycles when the buffer stage is in its quiescent state, that is, when there is no pulse from the monostable multivibrator in the buffer stage. The readout scaler 25 is, as indicated previously, a decade unit connected so that one pulse activates the 9 digit to the 8 digit, etc. Each digit is connected through a corresponding position in the digit amplifier 26, which acts as a printer actuator. The actuator 26 consists of a bank of solenoids, each one of which is coupled through a heavy current "and" gate to a position on the readout scaler and the second leg of the "and" gate is connected to the digit entry gate and amplifier 32. Thus the solenoid actuates a digit in the printer when there is a coincidence between the connection to the readout scaler and a signal from the digit entry gate and amplifier.

The operation of this translator is as follows. At the conclusion of a measurement cycle, the scaler provides a start signal to relay 33 and the actuation of this relay provides two outputs. The first output insures that bistable multivibrator 30 is in the X state; thus digit entry gate 32 is closed while distributor advance amplifier and gate 31 is opened. The distributor is in position 1 in cycle A which is "clear circuits" at this point. The closure of relay 33 provides a negative signal of short duration to buffer stage 35 which inverts it and carries this signal to bistable multivibrator 30, distributor gate 31 and digit entry gate 32. Digit entry gate 32 is, as indicated, closed and therefore no action takes place. Bistable multivibrator 30 only changes state in response to negative pulses, hence no action takes place here. Distributor advance gate 31 is however open and the pulse from buffer 35 advances the distributor one position, so that sample tally decade No. 2 is addressed. The details of the address mechanism will be described below; however, the effect of the sample tally decade No. 2 being addressed is that it and it alone is capable of accepting pulses from the oscillator at this point. The gated multivibrator 23 is free running where there is no positive pulse in the buffer, so that this multivibrator is oscillating and provides the output pulses. The distributor is in cycle A and switch 24 is therefore correspondingly in position A which connects these output pulses to the scaler counter and the sample tally units. Since only the sample tally decade is addressed, pulses actuate only this decade unit; the pulses are being provided of course in parallel to readout scaler 25. When the sample tally decade No. 2 is filled up by these pulses, it provides a complement signal which fires monostable multivibrator 34 and the appearance of the pulse from this monostable multivibrator on buffer 35 shuts off the multivibrator 27, thereby providing that the readout scaler is stopped at the same number of pulses and leaving the one position on digit amplifier 26 which corresponds to that level of pulses in the readout scaler actuated on one half of the "and" gate connected to the solenoid. The positive pulse from the monostable multivibrator is inverted in the buffer stage and hence the leading edge of this pulse is a negative going change. The input to the bistable multivibrator differentiates the pulse from the buffer stage and the leading edge thereby becomes a negative pulse which changes the state of the multivibrator from its position X to its state Y, thereby closing distributor advance gate 31 but opening digit entry gate 32. Digit entry gate and amplifier 32 is responsive also to a negative pulse, but does not have a differentiator at its input; hence the entire monostable multivibrator pulse which is negative coming out of the buffer stage 35 actuates the digit entry gate 32 and amplifier, which then provides a signal to the second leg of all of the "and" gates in digit amplifier 26. The action of the appropriate "and" gate then enters the digit corresponding to the position of the readout scaler which is actuated. At the conclusion of the 100 milliseconds duration of the monostable multivibrator pulse 34 the positive going trailing edge of this pulse is presented to the bistable multivibrator 30 which does not change state because the pulse is positive and the distributor advance gate remains closed because the bistable multivibrator is in state Y. However, at the conclusion of this monostable pulse the multivibrator 27 again commences free running and continues to provide pulses to both readout scaler 25 and the address decade sample tally No. 2 until readout scaler 25 is complemented to its zero position, at which time a pulse is provided from the zero position on readout scaler 25 which again acts as a complement signal firing the monostable multivibrator and thereby cutting off the action of the gated multivibrator 27. At this point sample tally scale No. 2 has been returned so that it now reads the same digit as it did prior to readout. The positive pulse from the monostable multivibrator 34 is now inverted in the buffer stage 35 and its negative leading edge differentiated again changes the state of bistable multivibrator 30 from state Y to state X, thus closing digit entry gate 32 and opening distributor advance gate 31. The trailing edge of the monostable multivibrator pulse coming from the buffer 35 has a positive aspect and passes through distributor advance gate 31 and advances the distributor to the next address position which is sample tally position No. 1 and the gated multivibrator 27 now provides oscillator pulses to this new address.

At the conclusion of entering the digit for sample tally No. 1 which takes place in exactly the same manner as it did for sample tally No. 2, the next address position on the distributor is the print-out and set for cycle B position. At this distributor point a print command is provided to the automatic printer which prints out on paper tape the digits which have thus far been entered. In this same position an action which has been designated "set for cycle B" takes place. This may constitute any form of switching which has for its essential nature the changing of the No. 1 point on the address from the clear circuits point to one which when this No. 1 position is again actuated will act to throw switch 24 from its A to its B position. The remainder of the distributor addresses in cycle A consist of the scaler count unit which constitute six decade units.

Cycle B of the distributor is initiated when, at the completion of the tenth position of the distributor which is "Read Scaler #1," the distributor returns to the No. 1 position which by virtue of the "set for cycle B" is now arranged to throw switch 24 from the A to the B position. Positions 2 and 3 are labeled "enter zero." This feature is required because conventional automatic printing apparatus provides a decimal point before its final two digits which are printed and since there are no fractional counts in the count scaler it is desired to have two zeros after the decimal point. The fourth position then is again a print-out command which prints out the total from the scaler count units. The remainder of the distributor cycle consists of reading out the five decade units of the timer and printing out this information, then resetting the translator.

Figures 4, 5:
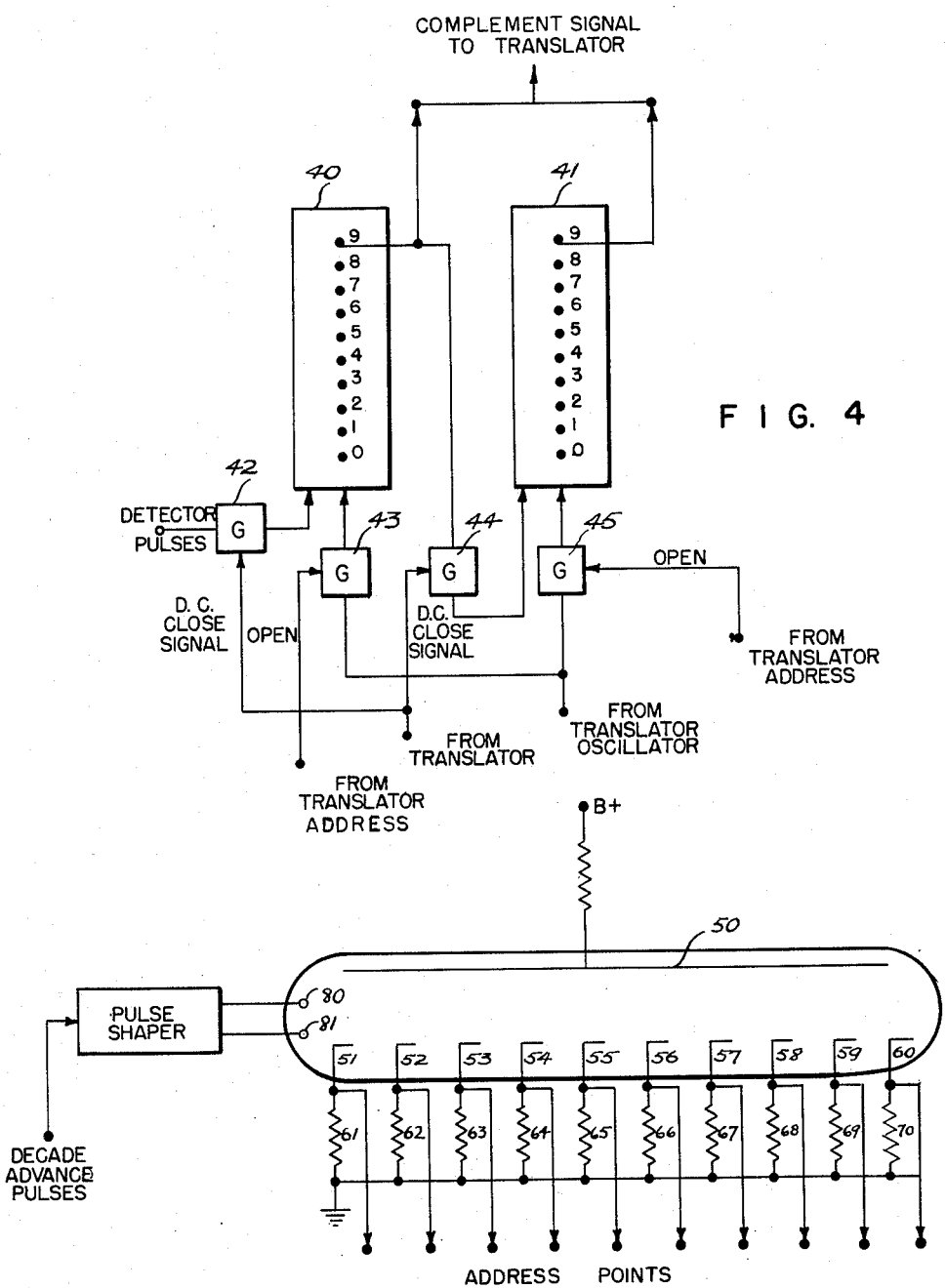
FIG. 4 is an illustration in block diagrammatic form of the decade scale coupling system of this invention.
FIG. 5 is an illustration partly in block diagrammatic and partly in schematic form of one embodiment of a decade distributor of this invention.

In the previous discussion the address system for selecting one decade unit to be pulsed has been mentioned without discussion of the details of its operation. FIG. 4 is a block diagram of two typical decade units 40 and 41, which in their normal operation are cascaded; that is, when decade 40 goes from its 9 to its zero position it puts one pulse on the input of decade 41. In the operation of the address system, not only must an input be provided for pulses from the translator to actuate an individual decade unit, for example decade 40, but also the coupling from decade 40 to 41 must be inhibited so that when decade 40 in the readout cycle changes from its 9 position to its zero position it does not provide a pulse to decade unit 41. These functions are accomplished by a series of gates 42, 43, 44 and 45. Gates 42 and 44 are normally open gates, that is they require a signal to close them to passage of signals through them, while gates 43 and 45 are normally closed gates which require an open signal to allow pulses to pass through them. During the measurement cycle there is no signal coming from the translator and gates 42 and 44 are open while gates 43 and 45 are closed. Thus as indicated in FIG. 4 pulses from the detector come through gate 42 into decade unit 40 and when the decade unit 40 changes from the 9 to the zero position a pulse is forwarded through open gate 44 to the next decade 41, thus providing the usual cascade action. During the readout and print-out cycle, however, the translator provides a close signal by means of a D.C. bias to gates 42 and 44, thus acting to inhibit pulses from the detector from reaching decade unit 40 and to segregate decade 40 and decade 41 from one another. Physically this bias may be provided as a D.C. bias on the lead from scaler selector unit 24 which carries as its A.C. component the oscillator pulses themselves. The address function which provides on one lead a changed voltage is used to open the gate which in the case of the address being decade 40 would be gate 43, and of course the other decades are not opened since they are not addressed. Thus gate 43 is opened to pulses from the translator oscillator when it fires. As indicated in FIG. 4 the complement signal may be taken from the uppermost point, digit 9, on the decade units and is selected to occur when digit 9 goes from the actuated to the nonactuated state.

While, as indicated in the preceding discussion, the address distributor may be any conventional decade unit in this embodiment, a typical example is shown in FIG.

5, which is a "glow transfer" tube decade unit. The decade unit is shown as a gas discharge tube having a single anode 50 and ten cathodes 51 through 60 respectively. The action of this tube is such that a glow discharge occurs between the plate 50 and only one of the cathodes 51 through 60 at a time. On reset the decade is arranged so that the glow discharge is always initially on cathode 51. Each of the cathodes 51 through 60 is connected through a resistor 71 through 80 respectively to ground and hence when the discharge is located on a particular cathode, for example cathode 51, the current drawn through this resistor 71 raises the cathode potential thus providing a changed bias for only that cathode. The action of the tube is such that upon application of a properly shaped pulse to its grids 81 and 82 the discharge is stepped one position to the right to the next cathode, thus raising its potential while returning the previous cathode potential to normal. Thus each succeeding pulse steps the discharge along the chain of cathodes. When the discharge is on cathode 60 the next pulse returns it to cathode 51, since physically the cathodes are arranged in a circle. Thus a distributor such as is indicated in FIG. 3 uses for each position the change of potential on each of the ten cathodes to provide ten address points and, as indicated in the discussion concerning the translator as exemplified in FIG. 3, there are two connections to each of the cathodes of a single decade which are actuated when the glow discharge is at the cathode, but by virtue of the operation of switch 24 and an enabling circuit for this switch, only one of the two connections addressed for each cathode carries out any action in each cycle.

While the discussion previously has been limited to decade scale units, it is clear that the invention disclosed herein is not so limited. The units could be binary or a 100-digit scale or any other suitable scale number and the principles would equally apply. Again while the information taken from the electronic scaler has been limited to a counts readout and a time readout, further information if accumulated in the scaler could also be read out and printed out utilizing this invention and providing a larger or more complex distributor. Again the discussion has been in the context of a nuclear detector and automatic sample changer, but the system could apply equally well to a detector for a single sample with repeated measurements where, instead of a sample tally, the serial number of each measurement such as the first, second, third, etc. measurement of a single sample could be tabulated. Even more broadly, the invention should not be construed as limited to reading out pulses accumulated in an electronic scaler from a nuclear detector, but rather any source of pulses which are counted and the information accumulated in an electronic scaler will serve.

From the foregoing it is obvious that many modifications and improvements may now be made by those skilled in the art; the invention disclosed herein should be construed as limited only by the spirit and scope of the appended claims.

What is claimed is:

1. A digital data processing system comprising scaler means adapted to accumulate digital information; a plurality of cascaded scaling elements included within said scaler means, each of said scaling elements having a predetermined maximum digital capacity; printing means adapted to store a plurality of serially entered digits and subsequently to print out said plurality of serially entered digits simultaneously in parallel form in response to an applied stimulus; circuit means for applying pulses to each of said scaling elements; address means adapted to connect said circuit means independently to each of said scaling elements in sequence, said circuit means being adapted to apply to each of said scaling elements only that number of pulses required to reach said maximum digital capacity; translator means adapted to convert the number of pulses applied to each successive one of said scaling elements into a digit entry for said printing means representative of the digital information accumulated in said scaling element and to return said scaling element to the state where it contains said accumulated digital information, before said address means connects said circuit means to the next successive one of said scaling elements; contact means adapted to provide an applied stimulus to said printing means after a predetermined number of said digit entries.

2. A digital data processing system comprising scaler means adapted to accumulate digital information; a plurality of cascaded scaling elements included within said scaler means, each of said scaling elements having a predetermined maximum digital capacity; printing means adapted to store a plurality of serially entered digits and subsequently to print out said plurality of serially entered digits simultaneously in parallel form in repsonse to an applied stimulus; a transfer scaler having the same maximum digital capacity as each of said plurality of scaling elements; address means adapted to select independently and sequentially each of said scaling elements; circuit means adapted to supply pulses simultaneously to the respective selected scaling element and said transfer scaler until said selected scaling element is filled, said transfer scaler being adapted to provide as an output a digit entry representative of the complement of the number of pulses accumulated in said transfer scaler when said selected scaling element is filled; actuator means operative upon the filling of said selected scaling element to enter said representative digit into said printing means, said circuit means acting upon completion of said digit entry to supply pulses to said selected scaling element and to said transfer scaler until said transfer scaler is filled, whereby said transfer scaler and said selected scale are returned to their initial digital storage condition; control means adapted to provide an applied stimulus to said printing means after a predetermined number of said digit entries.

3. A digital data processing system comprising scaler means having a plurality of scaling elements normally connected in cascade and adapted to accumulate digital information, each of said scaling elements having a predetermined maximum count capacity; printing means adapted to store serially entered digits and print out said serially entered digits in parallel form in response to an applied stimulus; address means adapted to select sequentially and independently each of said scaling elements, said address means including means for sequentially isolating each said selected scaling element from the remainder of said plurality of scaling elements; a pulse generator adapted to provide as an output in response to a gating signal a pulse train at a predetermined frequency; a transfer scaler having the same maximum count capacity as each of said scaling elements; a printing actuator adapted to provide a digit entry to said printing means of a digit representative of the complement of the accumulated count in said transfer scaler; means for causing said address means to select the first sequential one of said scaling elements; means connecting said pulse generator output to said transfer scale and to the selected one of said scaling elements, means operative at the time of selection of each of said scaling elements for applying a gating signal to said pulse generator; means responsive to the filling of said selected scaling element to maximum capacity for turning off said pulse generator and actuating said printing actuator, thereby entering a digit into said printing means; means actuated by the entry of said digit for again applying a gating signal to said pulse generator; means responsive to the filling of said transfer scaler for turning off said pulse generator and thereupon to advance said address means to select the next sequential scaling element; means operable after entering digits for a predetermined number of scaling elements for providing an applied stimulus to said printing means.

4. A digital data processing system comprising scaler means including a plurality of cascaded scaling elements and adapted to accumulate digital information, each of said plurality of scaling means having a predetermined maximum digital capacity; printing means adapted to store serially entered digits and print out said serially entered digits in parallel form in response to an applied stimulus; isolation means adapted to isolate each of said plurality of scaling elements from the remainder of said scaling elements; a gated multivibrator adapted to provide a pulse train output at a predetermined rate in response to a gating signal; a transfer scaler having the same maximum digital capacity as each of said plurality of scaling elements; means connecting the output of said gated multivibrator to said transfer scaler; address means adapted to couple the output of said multivibrator to each of said scaling elements independently in sequence; control means adapted to advance said address means one position in said sequence in response to an applied signal; a printing actuator adapted to provide in response to an applied signal a digit entry to said printing means of a digit representative of the complement of the stored count in said transfer scaler; a signal generator adapted to provide an output signal when the accumulated count in each of said scaling elements is complemented and to provide an output signal when the accumulated count in said transfer scaler is complemented; a bistable element having first and second states, said bistable element being changed from one of said states to the other in response to the trailing edge of the said output signal from said signal generator, said bistable element acting in said first state to apply said output signal from said signal generator to said control means to advance said address means and in said second state to apply said output signal to said printing actuator to provide said digit entry, said bistable means being arranged such that said address means is advanced in response to the one of said generator output signals provided in response to said transfer scaler being complemented; means operative in the absence of said output signal from said signal generator to apply a gating signal to said gated multivibrator; printing control means adapted to print out said digits entered into said printing means after a predetermined number of said digit entries.

5. A digital data processing system comprising scaler means having a plurality of scaling elements and adapted to accumulate and store digitally presented information, each of said scaling elements having a predetermined maximum digital capacity; printer means adapted to store a plurality of serially entered digits and subsequently print out said plurality of serially entered digits simultaneously in parallel form in response to an applied stimulus; circuit means adapted to determine the difference between the stored count in any of said scaling elements and the maximum capacity of the respective one of said scaling elements; means for operatively coupling said circuit means to each of said scaling elements in sequence, said coupling means including no more than one individual lead to each of said scaling elements and no more than two common leads to all of said scaling elements; means for actuating said circuit means to independently determine the respective difference for each of said scaling elements in sequence and adapted to leave each of said scaling elements with said stored count retained; translator means adapted to enter digits related to said differences in the same sequence as digit entries into said printing means; control means adapted to provide an applied stimulus to said printing means after a predetermined number of said digit entries.

References Cited in the file of this patent
UNITED STATES PATENTS

| | | |
|---|---|---|
| 2,692,551 | Potter | Oct. 26, 1954 |
| 2,757,862 | Boyden et al. | Aug. 7, 1956 |
| 2,767,907 | Schwend | Oct. 23, 1956 |
| 2,772,048 | Collison et al. | Nov. 27, 1956 |
| 2,793,806 | Lindesmith | May 28, 1957 |
| 2,799,222 | Goldberg et al. | July 16, 1957 |
| 2,843,840 | Brinster et al. | July 15, 1958 |
| 2,847,268 | Cowper | Aug. 12, 1958 |
| 2,860,832 | Burns | Nov. 18, 1958 |